United States Patent
Ream

(10) Patent No.: US 6,476,844 B1
(45) Date of Patent: Nov. 5, 2002

(54) METHOD AND APPARATUS FOR ELECTROPHOTOGRAPHIC LASER VIDEO MODULATION AND DECODE FOR SPOT FIDELITY

(75) Inventor: Gregory Lawrence Ream, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 09/689,936

(22) Filed: Oct. 12, 2000

(51) Int. Cl.[7] ............................. B41J 2/47; B41J 2/435
(52) U.S. Cl. .............................. 347/237; 347/247
(58) Field of Search ............................. 347/240, 237, 347/247, 255, 239, 142; 375/148, 220, 227, 293, 296, 346

(56) References Cited

U.S. PATENT DOCUMENTS

| | | | |
|---|---|---|---|
| 4,928,289 A | 5/1990 | Dingeman | 375/293 |
| 4,991,920 A | 2/1991 | Peczalski | 385/14 |
| 5,283,658 A | 2/1994 | Hayashi et al. | 358/296 |
| 5,363,208 A | 11/1994 | Ogino et al. | 358/445 |
| 5,379,126 A | 1/1995 | Seto et al. | 358/456 |
| 5,387,985 A | 2/1995 | Loce et al. | 358/447 |
| 5,392,061 A | 2/1995 | Vondran, Jr. | 347/252 |
| 5,436,644 A | 7/1995 | Motoi et al. | 347/256 |
| 5,479,175 A | 12/1995 | Cianciosi et al. | 347/252 |
| 5,521,625 A | 5/1996 | Morrison | 347/128 |
| 5,535,343 A | 7/1996 | Verseput | 375/359 |
| 5,579,090 A | 11/1996 | Sasanuma et al. | 399/49 |
| 5,581,292 A | 12/1996 | Cianciosi et al. | 347/131 |
| 5,633,669 A | 5/1997 | Hada et al. | 347/132 |
| 5,638,463 A | 6/1997 | Ohshita | 382/195 |
| 5,652,660 A | 7/1997 | Seto et al. | 358/300 |
| 5,659,399 A | 8/1997 | Lin et al. | 358/298 |
| 5,712,962 A | 1/1998 | D'Entremont | 358/1.7 |
| 5,742,323 A | 4/1998 | Fukushima | 347/246 |
| 5,751,470 A | 5/1998 | Damon | 358/298 |
| 5,793,406 A | 8/1998 | Trask et al. | 347/252 |
| 5,854,652 A | 12/1998 | Andersen | 347/246 |
| 5,867,203 A | 2/1999 | Jones et al. | 347/251 |
| 5,875,044 A | 2/1999 | Seto et al. | 358/518 |
| 5,896,489 A | 4/1999 | Wada | 358/1.2 |
| 5,943,088 A | 8/1999 | Sakemi et al. | 347/252 |
| 5,982,508 A | 11/1999 | Kashihara | 358/456 |
| 5,987,244 A | 11/1999 | Kau et al. | 713/500 |
| 6,147,699 A | * 11/2000 | Berry et al. | 347/255 |

* cited by examiner

*Primary Examiner*—Hai Pham
(74) *Attorney, Agent, or Firm*—Taylor & Aust, P.C.

(57) ABSTRACT

A method of driving a laser device in an electrophotographic machine includes providing a binary image data signal having a first switching rate. A plurality of binary encoded data signals are transmitted over a transmission medium. Each of the encoded data signals is dependent upon the image data signal and has a respective second switching rate lower than the first switching rate. The image data signal is recreated by using the encoded data signals. The laser device is driven with the recreated image data signal.

14 Claims, 7 Drawing Sheets

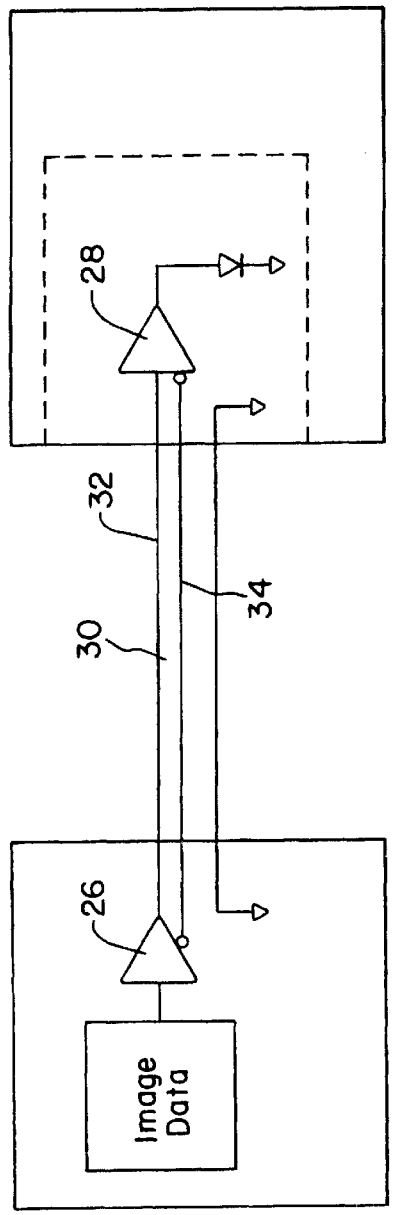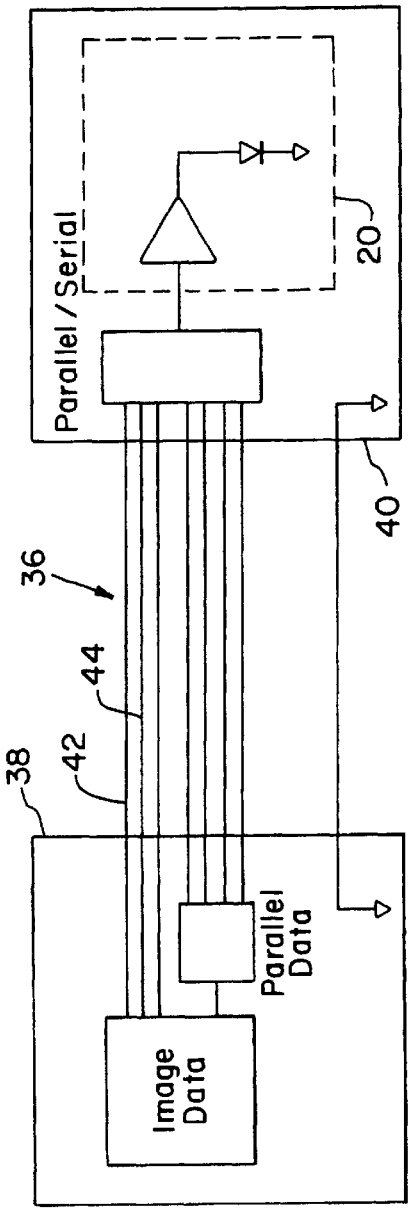
Fig. 3 (Prior Art)
Fig. 4 (Prior Art)

METHOD AND APPARATUS FOR ELECTROPHOTOGRAPHIC LASER VIDEO MODULATION AND DECODE FOR SPOT FIDELITY

BACKGROUND OF THE INVENTION

1. Field of the Invention

The present invention relates to a method and apparatus for modulation of a laser diode, and, more particularly, to a method and apparatus for minimizing electromagnetic interference resulting from modulation of a laser diode.

2. Description of the Related Art

Monochrome and color electrophotographic printers using laser scanning unit imaging require accurate, high-bandwidth modulation of the laser diode to produce high resolution halftone and color images. The time per pixel is determined by process speed, addressability, and laser scan efficiency. Higher speed and higher addressability printers possess shorter pixel times and higher video frequency content. Sub-pixel modulation used for half-tone or multi-level imaging at each pixel results in an even higher bandwidth requirement. Here, modulation is binary, i.e., the laser is switched between an ON state and an OFF or standby state.

The video path from the raster-image-processor data source to a properly designed laser driver typically limits the quality of image reproduction when tradeoffs are made to prevent undesirable electromagnetic radio-frequency emissions and interference. These tradeoffs typically involve adding inductors and capacitors to reduce electromagnetic interference at the expense of limiting or distorting video signals. Driver and receiver rise and fall times, turn-on and turn-off delays, and drive current capability also limit bandwidth and signal fidelity. Cable length, impedance, termination impedance, and losses further limit bandwidth and signal fidelity.

Lexmark printers using laser-scanning-unit printheads are now available with process speeds as high as 34 pages (8.5"×11") per minute at 600 dots per inch (dpi) addressability and 17 pages per minute at 1200 dpi. Time per pixel for these printers is approximately 33.5 nanoseconds at 600 dpi and 18.6 nanoseconds at 1200 dpi. Each 600-dpi pixel is subdivided into eight 4.23 nanosecond slices, and each 1200 dpi pixel is subdivided into four 4.65 nanosecond slices. Each imaged pixel is ON for typically 25.4 nanoseconds (six of eight slices) at 600 dpi and 9.3 nanoseconds (two of four slices) at 1200 dpi. For consistent reproduction of half-tone images and fine-feature graphics, a laser diode 10 (FIG. 1) must faithfully reproduce the binary video signal generated at a raster image processor 12. This involves faithful transmission of the video signal over a cable 14 from a driver module 16 of raster image processor 12 to a receiver module 18 remotely located on a laser driver 20 of a laser scanning unit 22. This may be a distance d of 4 inches to 30 inches or more.

It is known to transmit a single-ended (not differential) signal over a twisted pair or shielded coaxial cable 24 (FIG. 2). The binary video signal at driver 16 is attenuated to a fraction of a TTL signal swing (from typically 3.4 V peak-to-peak to 1.8 V peak-to-peak) and level-shifted to be centered around the threshold voltage at receiver module 18. This approach minimizes signal swing and consequently radiated electromagnetic signal amplitude. However, this approach also introduces sensitivity to receiver, threshold variation, which can result in unexpected changes in laser ON time.

Another method of transmitting data that retains signal fidelity and minimizes electromagnetic interference is the use of a paired differential driver 26 (FIG. 3) and receiver 28. Here, electromagnetic interference is minimized to the extent that equal and opposite polarity signals are present in video cable 30, leading to cancellation of radiated radio frequency energy. Signal amplitude can be reduced for lower electromagnetic emissions by using a differential receiver 28 with less sensitivity to receiver threshold variation as compared to the single-ended receiver 18. Frequency content in leach of two signal wires 32, 34 is that of the high-frequency binary data. Commercially available differential driver-receiver pairs 26, 28 designed for high speed data tend to produce large switching currents. Using these drivers, differences in driver switching times and differences in line impedance have resulted in more electromagnetic interference than expected.

Serial-to-parallel conversion of data prior to transmission, and parallel-to-serial conversion at laser driver 20, as shown in FIG. 4, offers another way of keeping data frequency low over a video cable 36 interconnecting a raster image processor 38 and a laser scanning unit 40. However, to properly recreate the serial binary sub-pixel modulated data, both a data clock and a high-frequency gating signal must be carried in lines 42 and 44 of cable 36. This may create a worse electromagnetic compatibility problem than transmitting the serial data, since the gating signal has the same sub-pixel frequency content as the serial data for every pixel time. Another problem is that additional wires add to cost.

What is needed in the art is a simple and low cost method of passing a high bandwidth video modulation signal from a raster image processor to a laser print head driver with reduced electromagnetic interference.

SUMMARY OF THE INVENTION

Thee present invention provides a two-wire on-off encode and exclusive-OR decode of binary video data to pass a high bandwidth modulated video signal from source to receiver with reduced electromagnetic interference.

The invention comprises, in one form thereof, a method of driving a laser device in a electrophotographic machine. A binary image data signal having a first switching rate is provided. A plurality of binary encoded data signals are transmitted over a transmission medium. Each of the encoded data signals is dependent upon the image data signal and has a respective second switching rate lower than the first switching rate. The image data signal is recreated by using the encoded data signals. The laser device is driven with the recreated image data signal.

The invention comprises, in another form thereof, an apparatus for driving a laser device in an electrophotographic machine. The apparatus includes a raster image processor having an image data source outputting a binary image data signal with a first switching rate. A data encoder receives the binary image data signal and transmits a plurality of binary encoded data signals over a transmission medium. Each of the encoded data signals is dependent upon the image data signal and has a respective second switching rate lower than the first switching rate. A laser scanning unit includes a data decoder receiving the binary encoded data signals over the transmission medium and recreating the image data signal by using the encoded data signals. A laser driver drives the laser device with the recreated image data signal.

An advantage of the present invention is that electromagnetic interference is reduced at low cost.

Another advantage is that signal quality is sufficient to reproduce the sub-pixel modulation required for halftone reproduction in a 20 pages per minute, 1200 dpi addressable electrophotographic printer using laser scanning unit imaging.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a schematic diagram of yet another embodiment of a prior art laser video modulation apparatus;

FIG. 4 is a schematic diagram of a further embodiment of a prior art laser video modulation apparatus;

FIG. 9 is a schematic diagram of another embodiment of a laser video modulation and decoding apparatus of the present invention.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figures 1, 2:
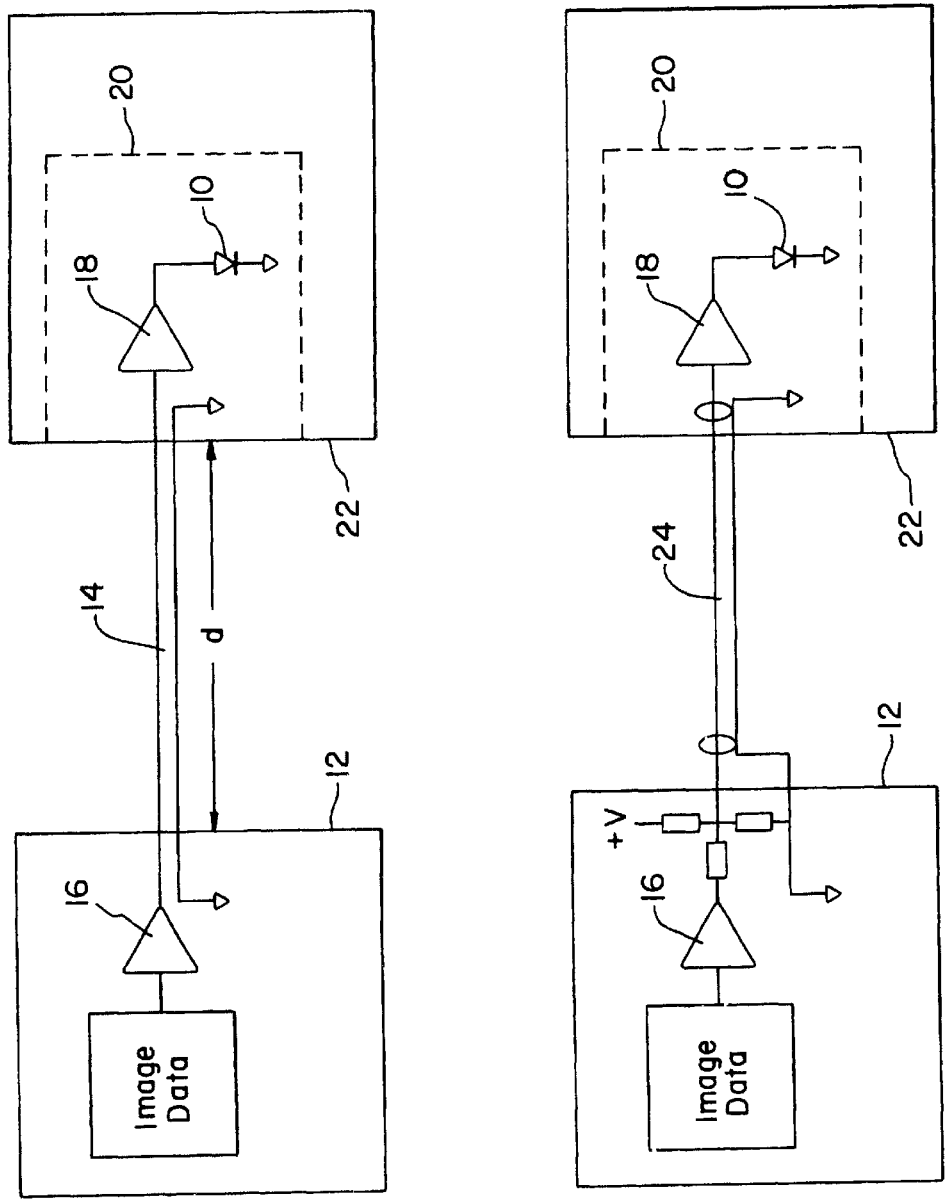
FIG. 1 is a schematic diagram of one embodiment of a prior art laser video modulation apparatus.
FIG. 2 is a schematic diagram of another embodiment of a prior art laser video modulation apparatus.
Figures 5, 6:
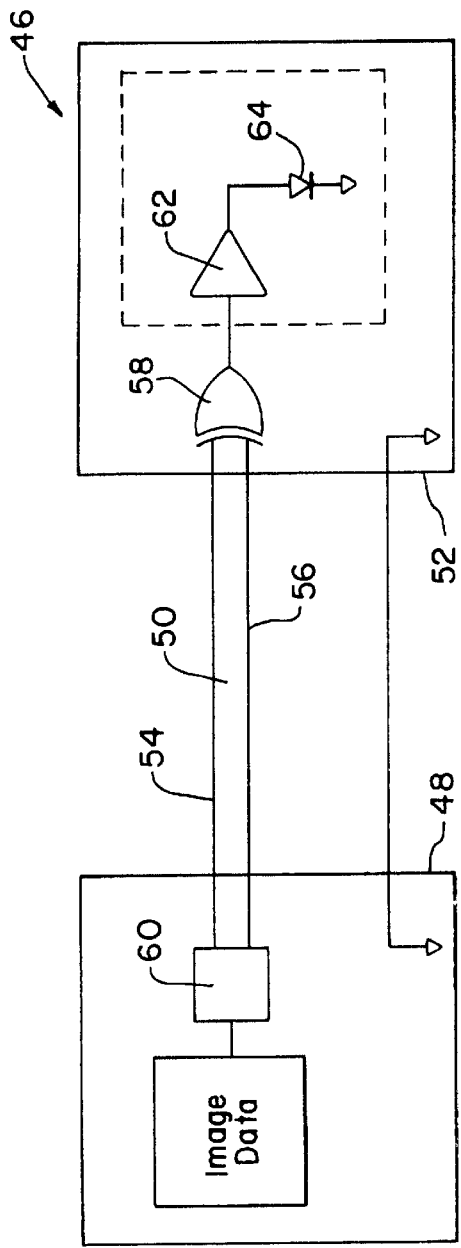
FIG. 5 is a schematic diagram of one embodiment of a laser video modulation and decoding apparatus of the present invention.
FIG. 6 is a truth table for the exclusive-OR of FIG. 5.

A first embodiment of a laser video modulation and decoding apparatus 46 of the present invention is illustrated in FIG. 5. Here, high frequency binary data from raster image processor 48 is encoded into two signals for transmission over a video cable 50 interconnecting raster image processor 48 and laser scanning unit 52. The simplest encoding algorithm is to produce a transition on first line 54 corresponding to a 0 to 1 transition (ON) of the input data, and to produce a transition on second line 56 corresponding to a 1 to 0 transition (OFF) of the input data. The resulting signal on second line 56 is then a delayed replica of the signal on first line 54, with the delay equal to the duration of the high or low binary input data pulse. The switching rate of the encoded signals on each of lines 54 and 56 is approximately one-half the switching rate of the input data. The original binary data is reconstructed by operation of an exclusive-OR logic gate 58 at laser scanning unit 52. The truth table for an exclusive-OR is shown in FIG. 6. Apparatus 46 also includes a data encoder and driver 60, a laser driver 62 and a laser 64.

Figure 7A:
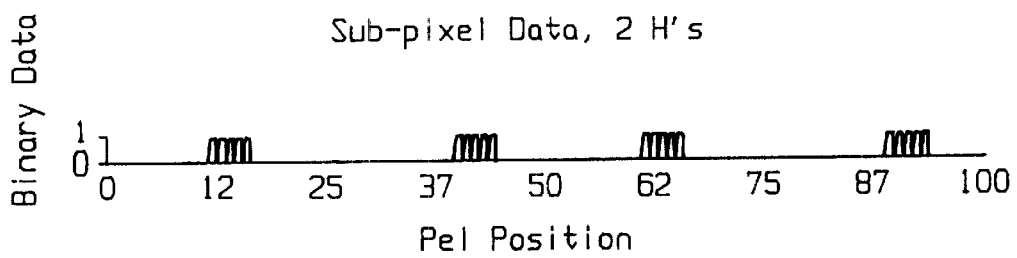
FIG. 7a is a plot of sub-pixel binary-modulated data produced at the raster image processor of FIG. 5.
Figure 7B:
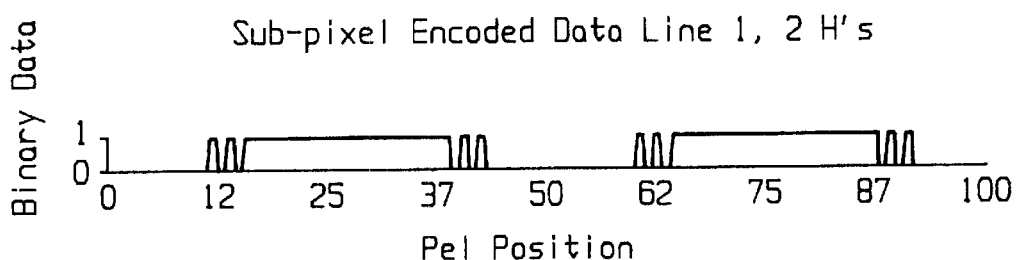
FIG. 7b is a plot of encoded data for transmission on the first line of FIG. 5.
Figure 7C:
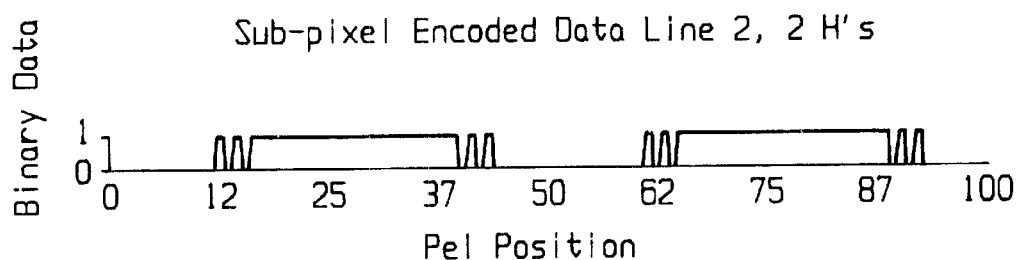
FIG. 7c is a plot of encoded data for transmission on the second line of FIG. 5.
Figure 7D:
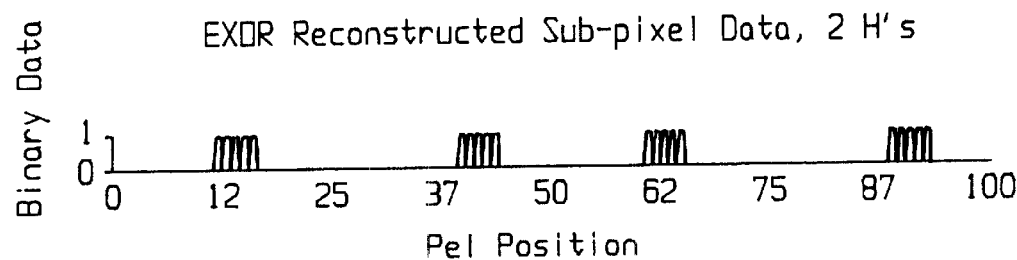
FIG. 7d is a plot of data reconstructed from the encoded data of FIGS. 7b and 7c.

An example of the raw data corresponding to generating a row of Courier 12 H's using ¾ ON time sub-pixel modulation is shown in FIG. 7a. More particularly, a single scan through the vertical strokes of two H's is illustrated in FIG. 7a, which shows the raster image processor data with five modulated picture elements per vertical stroke. FIG. 7b shows encoded data on line 54. FIG. 7c shows encoded data on line 56. The switching rate of the signals in FIGS. 7b and 7c is one-half the switching rate of the signal in FIG. 7a. FIG. 7d shows the reconstructed raster image processor data at the output of exclusive-OR 58 at laser scanning unit 52.

Figure 8A:
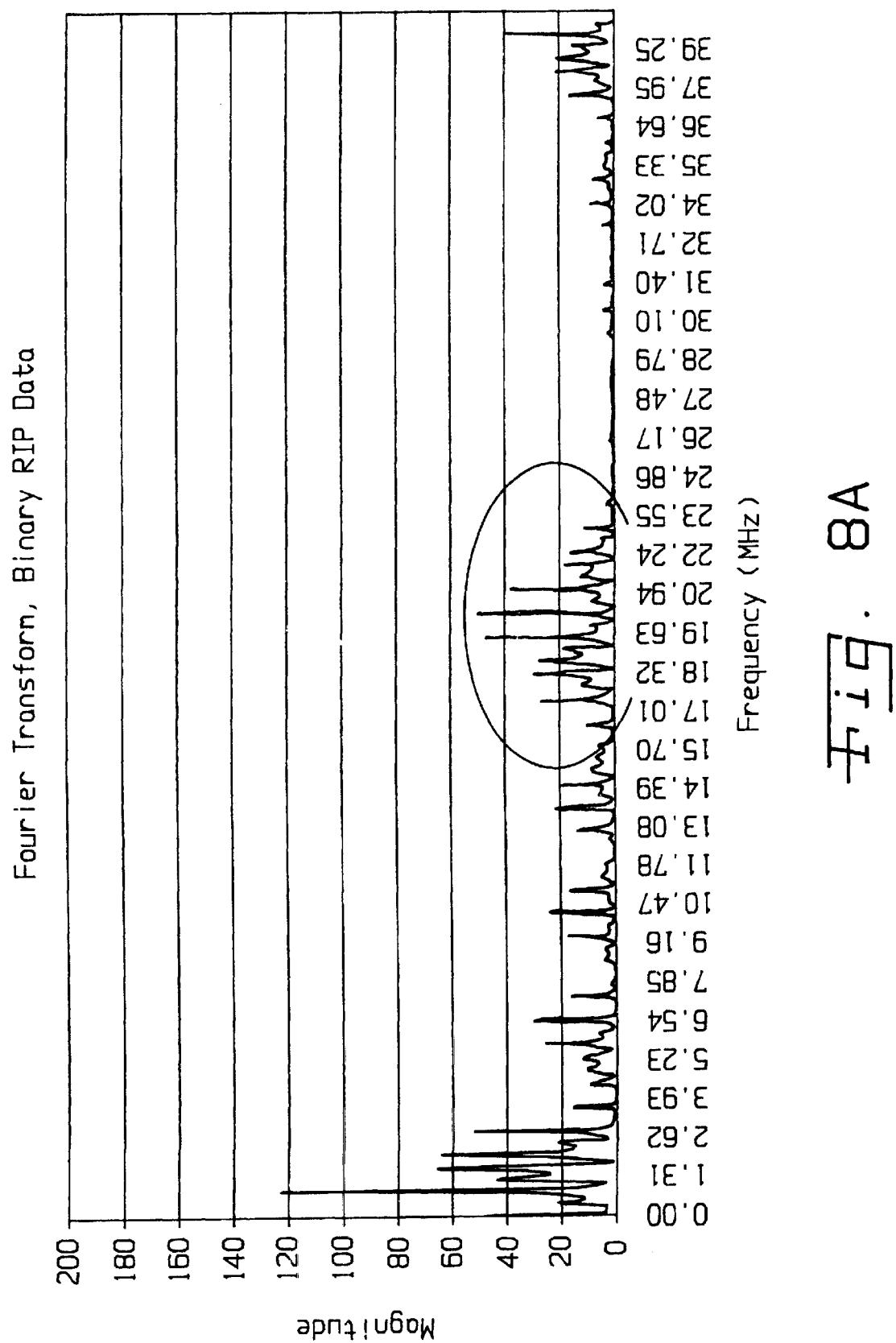
FIG. 8a is a plot of the frequency content of sub-pixel binary-modulated data produced at the raster image processor of FIG. 5.
Figure 8B:
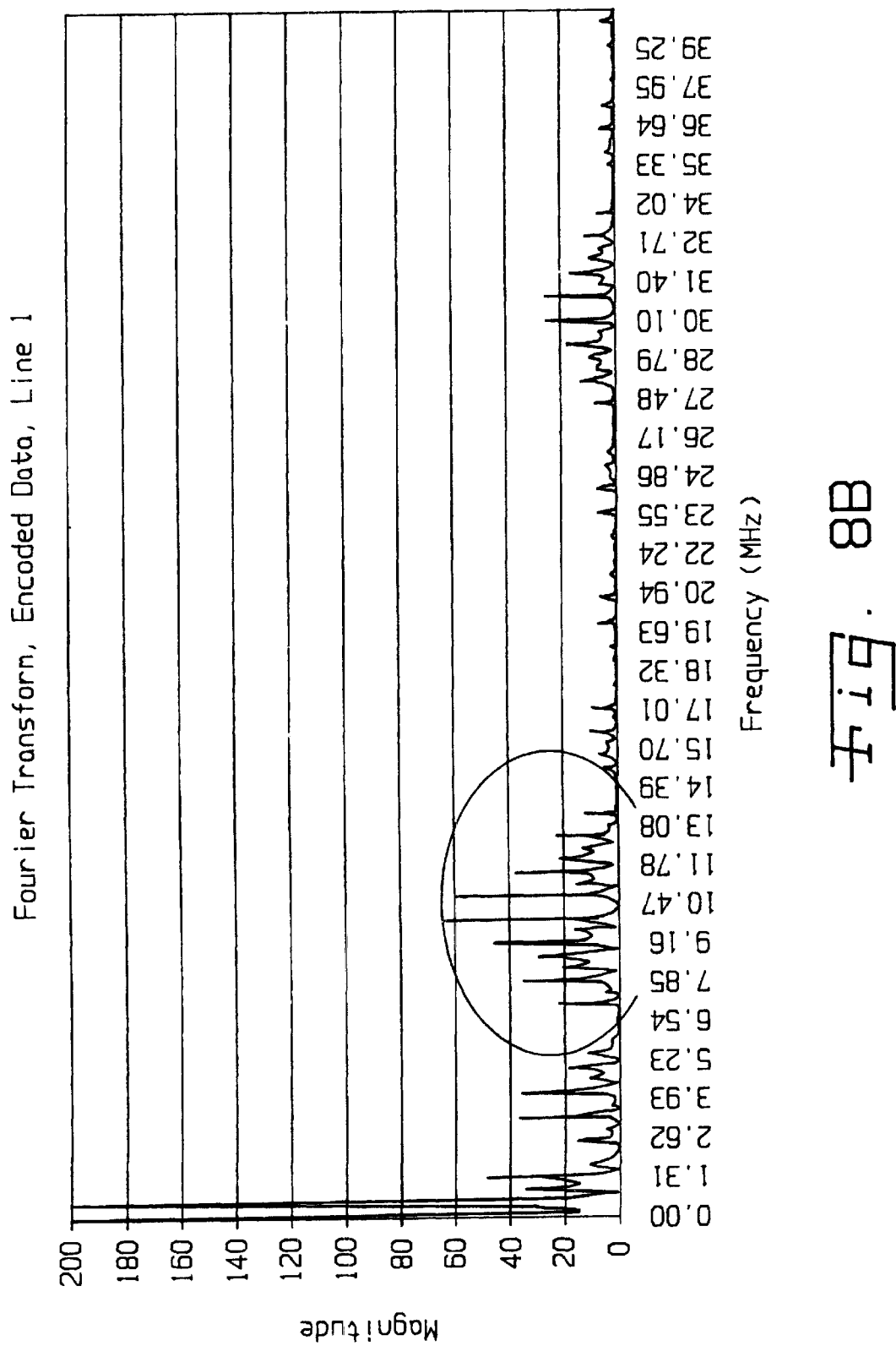
FIG. 8b is a plot of the frequency content of encoded data for transmission on the first line of FIG. 5.
Figure 6:
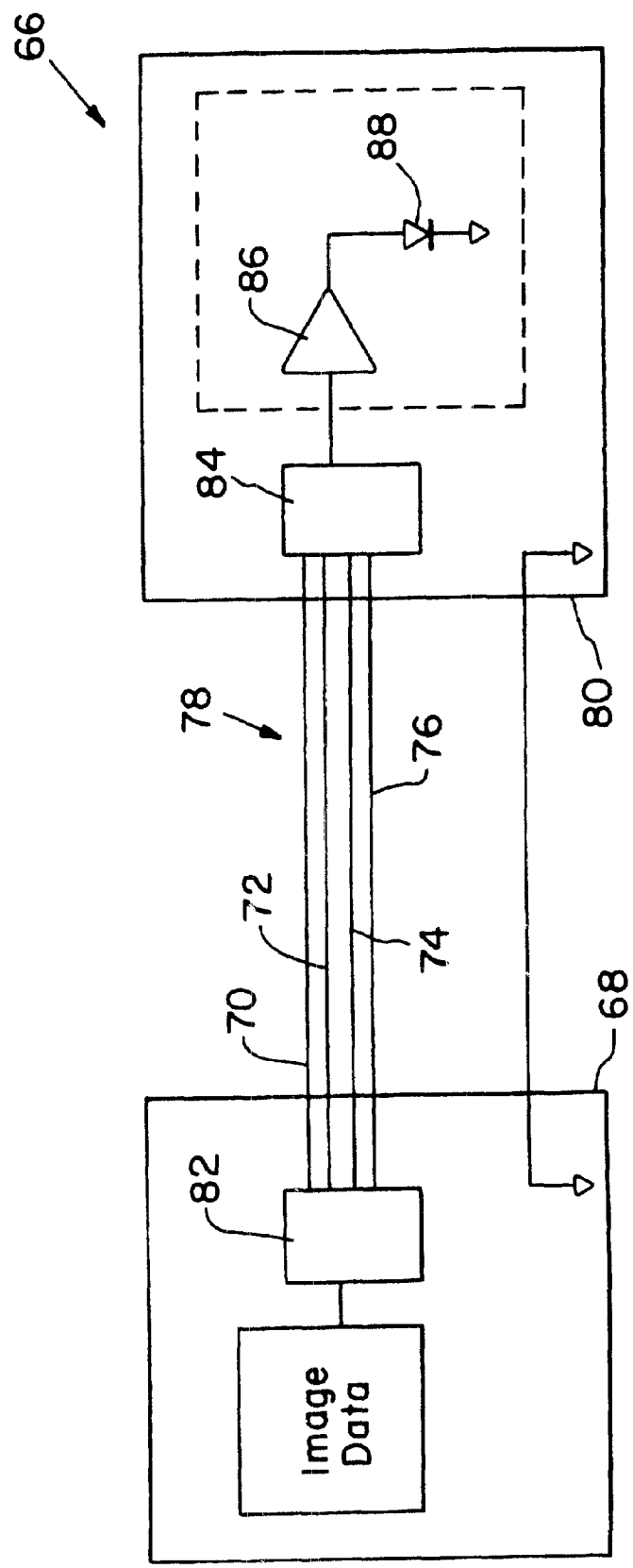

An example of the frequency content of the binary raster image processor data is shown in FIG. 8a. This example is for a 20 pages per minute, 600 dpi printer with 67% scan efficiency on an 8.5 inch writing line. Here, the frequency content corresponds to a 50.8 nanosecond pel time with ¾ sub-pixel ON time for imaged pixels when printing five Courier 12 H's. A similar example of the frequency content of the encoded data on line 54 is shown in FIG. 8b. There is a shift in frequency content from 19.7 MHz for the raster image processor data to 9.85 MHz for the encoded data on line 54, as shown by the circled regions in FIGS. 8a and 8b.

The two-wire exclusive-OR data transmission can be extended to any number of wires (odd or even). An extension of the two-wire exclusive-OR embodiment of FIG. 5 to a four-wire embodiment (FIG. 9) results in a further reduction in electromagnetic interference. In laser video modulation and decoding apparatus 66, each transition of the binary data from raster image processor 68 is encoded as a single transition on one of four lines 70, 72, 74 and 76 in a video cable 78 connecting raster image processor 68 to laser scanning unit 80. If the transitions are made on a rotating basis among the four lines 70, 72, 74 and 76, then the switching rate on each line is approximately ¼ of the switching rate of the input data entering data encoder and driver 82. A multiplexing data decoder 84 reconstructs the raster image processor binary data using an extended Ex-OR function. For example, if an even number of input signals is high then the output of decoder 84 is 0, and if an odd number of input signals is high then the output is 1. Apparatus 66 also includes a laser driver 86 and a laser 88.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of driving a laser device in an electrophotographic machine, said method comprising the steps of:

providing a binary image data signal having a first switching rate;

transmitting a plurality of binary encoded data signals over a transmission medium, each of the encoded data signals being dependent upon the image data signal and having a respective second switching rate lower than said first switching rate, each of the binary encoded data signals having a plurality of transitions;

recreating the image data signal by using the encoded data signals, the recreated image data signal having a plurality of transitions each corresponding to a respective said transition of said binary encoded data signals; and driving the laser device with the recreated image data signal.

2. The method of claim 1, wherein the first switching rate is an integer multiple of each of the second switching rates.

3. The method of claim 1, wherein each said second switching rate is equal to all other said second switching rates.

4. The method of claim 3, wherein a number of the encoded signals is equal to a factor by which the first switching rate is greater than each of the second switching rates.

5. The method of claim 1, wherein said transmission medium comprises a cable.

6. The method of claim 3, wherein said transmission medium includes a plurality of lines, said transmitting step including transmitting each of the binary encoded data signals over a respective one of said lines.

7. A method of driving a laser device in an electrophotographic machine, said method comprising the steps of:

providing a binary image data signal having a first switching rate, a plurality of upward transitions and a plurality of downward transitions;

transmitting a plurality of binary encoded data signals over a transmission medium, each of the encoded data signals being dependent upon the image data signal and having a respective second switching rate lower than said first switching rate, the plurality of binary encoded data signals comprising a first binary encoded data signal and a second binary encoded data signal, the first binary encoded data signal having a plurality of transitions each corresponding to a respective said upward transition of the binary image data signal, the second binary encoded data signal having a plurality of transitions each corresponding to a respective said downward transition of the binary image data signal;

recreating the image data signal by using the encoded data signals; and driving the laser device with the recreated image data signal.

8. A method of driving a laser device in an electrophotographic machine, said method comprising the steps of:

providing a binary image data signal having a first switching rate, a plurality of upward transitions and a plurality of downward transitions;

transmitting a plurality of binary encoded data signals over a transmission medium, each of the encoded data signals being dependent upon the image data signal and having a respective second switching rate lower than said first switching rate, the plurality of binary encoded data signals comprising a first binary encoded data signal and a second binary encoded data signal, the first binary encoded data signal having a plurality of transitions each corresponding to a respective said upward transition of the binary image data signal, the second binary encoded data signal having a plurality of transitions each corresponding to a respective said downward transition of the binary image data signal, the second binary encoded data signal comprising a delayed replica of the first binary encoded data signal;

recreating the image data signal by using the encoded data signals; and driving the laser device with the recreated image data signal.

9. An apparatus for driving a laser device in an electrophotographic machine, said apparatus comprising:

a raster image processor including:
an image data source configured to output a binary image data signal having a first switching rate; and
a data encoder configured to receive the binary image data signal and transmit a plurality of binary encoded data signals over a transmission medium, each of the encoded data signals being dependent upon the image data signal and having a respective second switching rate lower than said first switching rate; and a laser scanning unit including:
a data decoder configured to receive the binary encoded data signals over the transmission medium and recreate the image data signal by using the encoded data signals, said data decoder being configured to perform an extended exclusive-OR operation; and
a laser driver configured to drive the laser device with the recreated image data signal.

10. The apparatus of claim 9, wherein the transmission medium comprises a video cable.

11. The apparatus of claim 10, wherein the video cable includes a plurality of lines, each of the binary encoded data signals being carried on a respective one of said lines.

12. The apparatus of claim 9, wherein said data encoder comprises a means for reducing at least one of electromagnetic emissions and electromagnetic interference.

13. The apparatus of claim 9, wherein said data encoder comprises a means for improving electromagnetic compatibility.

14. An apparatus for driving a laser device in an electrophotographic machine, said apparatus comprising:

a raster image processor including:
an image data source configured to output a binary image data signal having a first switching rate; and
a data encoder configured to receive the binary image data signal and transmit a plurality of binary encoded data signals over a transmission medium, each of the encoded data signals being dependent upon the image data signal and having a respective second switching rate lower than said first switching rate; and a laser scanning unit including:
a data decoder configured to receive the binary encoded data signals over the transmission medium and recreate the image data signal by using the encoded data signals, said data decoder comprising an exclusive-OR logic gate; and
a laser driver configured to drive the laser device with the recreated image data signal.

* * * * *